(12) United States Patent
Knutson et al.

(10) Patent No.: US 12,529,949 B2
(45) Date of Patent: Jan. 20, 2026

(54) WIRE SUSPENDED PROJECTION SCREEN

(71) Applicant: Legrand AV Inc., Eden Prairie, MN (US)

(72) Inventors: Ron Knutson, Eden Prairie, MN (US); Erwin Riga, Weert (NL); L.P.M. Van Dinther, Weert (NL)

(73) Assignee: Legrand AV Inc., Eden Prairie, MN (US)

( * ) Notice: Subject to any disclaimer, the term of this patent is extended or adjusted under 35 U.S.C. 154(b) by 0 days.

(21) Appl. No.: 18/563,753

(22) PCT Filed: May 31, 2022

(86) PCT No.: PCT/US2022/031556
§ 371 (c)(1),
(2) Date: Nov. 22, 2023

(87) PCT Pub. No.: WO2022/251728
PCT Pub. Date: Dec. 1, 2022

(65) Prior Publication Data
US 2024/0255839 A1    Aug. 1, 2024

Related U.S. Application Data

(60) Provisional application No. 63/194,361, filed on May 28, 2021.

(51) Int. Cl.
*G03B 21/58* (2014.01)
*G03B 21/56* (2006.01)
(Continued)

(52) U.S. Cl.
CPC ............. *G03B 21/58* (2013.01); *G03B 21/56* (2013.01); *G03B 21/60* (2013.01); *G06F 1/1601* (2013.01); *H04M 1/0268* (2013.01)

(58) Field of Classification Search
CPC ........ G03B 21/58; G03B 21/56; G03B 21/60; G06F 1/1601; H04M 1/0268
(Continued)

(56) References Cited

U.S. PATENT DOCUMENTS

| 4,406,519 A | 9/1983 | Shaw |
| 5,632,317 A | 5/1997 | Krupke |

(Continued)

FOREIGN PATENT DOCUMENTS

| CN | 204256364 U | * | 4/2015 |
| CN | 206301141 U | * | 7/2017 |

(Continued)

OTHER PUBLICATIONS

International Search Report for PCT/US2022/031556, dated Sep. 30, 2022 (4 pgs).

(Continued)

*Primary Examiner* — Stephanie E Bloss
*Assistant Examiner* — Kevin C Butler
(74) *Attorney, Agent, or Firm* — Bradley J. Thorson; DeWitt LLP

(57) ABSTRACT

A wire suspended screen includes a roller assembly and a screen assembly. The roller assembly includes an inner tube and a plurality of sleeves partially extending around the inner tube, defining a longitudinal recess along the roller. The sleeves are spaced apart, defining gaps. Wires are attached to the inner tube and wind over the outer surface of the inner tube in the gaps. The wires are attached to an upper slat of the screen assembly. As the roller is rotated, the wires wind and unwind from the inner tube to raise and lower the screen assembly, depending on the direction of rotation. When the screen assembly is raised, the upper slat fits into the longitudinal recess. As the screen is raised further, the (Continued)

screen assembly winds over the exterior surface of the sleeves and upper slat. The roller can be motor driven.

20 Claims, 8 Drawing Sheets

(51) Int. Cl.
    *G03B 21/60*     (2014.01)
    *G06F 1/16*     (2006.01)
    *H04M 1/02*     (2006.01)

(58) Field of Classification Search
    USPC .......................................................... 359/461
    See application file for complete search history.

(56) References Cited

U.S. PATENT DOCUMENTS

| | | | | |
|---|---|---|---|---|
| 8,559,104 | B2 * | 10/2013 | Hendrics .............. | G03B 21/58 |
| | | | | 359/461 |
| 9,152,032 | B2 * | 10/2015 | Mullet .................. | G08C 23/04 |
| 2006/0256434 | A1 * | 11/2006 | Shopp .................... | G03B 21/58 |
| | | | | 359/461 |
| 2007/0153375 | A1 * | 7/2007 | Peterson ................ | G03B 21/58 |
| | | | | 359/443 |
| 2007/0153379 | A1 * | 7/2007 | Mikkelsen ............. | G03B 21/58 |
| | | | | 359/461 |
| 2011/0132557 | A1 * | 6/2011 | Kuroi ..................... | G03B 21/58 |
| | | | | 160/368.1 |
| 2012/0268815 | A1 * | 10/2012 | Hendricks ............. | G03B 21/58 |
| | | | | 359/461 |
| 2014/0133019 | A1 * | 5/2014 | Mullet ................... | G08C 17/02 |
| | | | | 359/461 |
| 2024/0255839 | A1 * | 8/2024 | Knutson ................ | G03B 21/58 |

FOREIGN PATENT DOCUMENTS

| | | | | |
|---|---|---|---|---|
| JP | 2011128338 A | * | 6/2011 | ............. G03B 21/58 |
| KR | 100844433 B1 | * | 7/2008 | ............. G03B 21/05 |
| KR | 101050820 B1 | * | 7/2011 | ............... B23Q 3/00 |
| WO | WO-2012149050 A1 | * | 11/2012 | ............. G03B 21/58 |

OTHER PUBLICATIONS

Written Opinion for PCT/US2022/031556, dated Sep. 30, 2022 (5 pgs).
Extended European Search Report for corresponding European patent application No. 22812324.6, dated Mar. 20, 2025 (9 pgs).

* cited by examiner

WIRE SUSPENDED PROJECTION SCREEN

RELATED APPLICATIONS

The present application claims priority to PCT Application No. PCT/US2022/031556 entitled WIRE SUSPENDED PROJECTION SCREEN, filed May 31.2022, and claims the benefit of U.S. Provisional Application No. 63/194,361, entitled WIRE SUSPENDED PROJECTION SCREEN, filed May 28, 2021, said applications being hereby fully incorporated herein by reference in their entirety.

TECHNICAL FIELD

The present application relates to screens for displaying images produced by video and film projectors, and more specifically, selectively wall, ceiling, and in-ceiling mounted projection screens that can be selectively deployed when desired.

BACKGROUND

Wall, ceiling, and in-ceiling mounted projection screens are a common feature in conference rooms, event venues, and theater spaces. It is often desirable for such screens to be concealed and deployed only when needed. Typically, the screen is stored on a roller and deployed and retracted by rotating the roller.

It is generally desirable that the screen be deployed so as to be at the eye level of the audience. In large spaces with high ceilings, however, this presents a challenge, especially for ceiling and in-ceiling mounted screens. In such installations, when the projection surface of the screen is presented at eye level, there is a large area above the projection screen that is not used. This area is typically made from black fabric with the projection surface material affixed at the bottom. Drawbacks of such screen designs are: (1) the large black area above the screen is visually distracting to the audience; and (2) the unusable area of the screen must be rolled on the roller leading to additional weight and bulk.

Wire suspended screens wherein the projection surface is suspended from wires coupled at each end of the screen roller are known. A drawback of these prior art wire suspended screens, however, is that wires only at the ends of the roller and attached to the upper corners of the projection surface are insufficient to support larger, wider, screens, leading to sagging and wrinkles in the screen. This diminishes the aesthetic appeal of the screen and the projected image.

What is needed in the industry is a wire suspended screen that addresses these shortcomings in the prior art.

SUMMARY

Embodiments of the present invention are directed to a wire suspended screen that addresses the shortcomings of prior art devices. In embodiments, the wire suspended screen includes a roller assembly and a screen assembly. The roller assembly includes a housing with a roller rotatably mounted in the housing. The roller has an inner tube and a plurality of sleeves partially extending around the inner tube, defining a longitudinal recess along the roller. The sleeves are spaced apart, defining gaps. Wires are attached to the inner tube and wind over the outer surface of the inner tube in the gaps and proximate the ends of the inner tube. The wires are attached to an upper slat of the screen assembly, which includes a substrate and a projection surface on the substrate. As the roller is rotated, the wires wind and unwind from the inner tube to raise and lower the screen assembly, depending on the direction of rotation. When the screen assembly is raised, the upper slat fits into the longitudinal recess. As the screen is raised further, the screen assembly winds over the exterior surface of the sleeves and upper slat until the bottom margin of the screen is retracted into the housing. The screen assembly can be lowered by rotating the roller in the opposite direction.

According to embodiments, a wire-suspended projection screen includes a selectively rotatable roller assembly with a substantially cylindrical inner tube having a length dimension, a plurality of sleeves spaced-apart along the length dimension of the inner tube, thereby forming at least one gap between adjacent ones of the plurality of sleeves, and at least three wires, a first end of each of the at three wires operably coupled to the inner tube, one of the at least three wires extending outwardly from the inner tube through the at least one gap. The wire-suspended projection screen can further include a screen assembly with a substrate having an upper edge, a projection surface affixed to the substrate, and a slat operably coupled with, and extending along, the upper edge of the substrate, a second end of each of the at least three wires operably coupled to the slat, wherein, as the roller assembly is rotated, each of the at least three wires winds around the inner tube. When the screen assembly is in a deployed position, the slat can be spaced-apart from the inner tube, and when the screen assembly is in a retracted position, the substrate and the projection surface of the screen assembly can be wrapped around the plurality of sleeves. The at least three wires can be equally spaced apart.

In embodiments, each one of the plurality of sleeves of the roller assembly defines a recess, the recesses of adjacent ones of the sleeves being aligned along the length dimension of the inner tube to form a longitudinal recess, and wherein the slat of the screen assembly is received in the longitudinal recess when the screen assembly is in the retracted position.

The wire-suspended projection screen can further include a housing, the roller assembly being received in the housing. The housing can include a pair of spaced-apart roller hanger assemblies, the roller assembly being rotatably mounted between the roller hanger assemblies.

In embodiments, when the screen assembly is in a deployed position, a deflection measured at a midpoint of the length dimension of the roller assembly is five millimeters or less.

In embodiments, the slat can be received in a pocket defined by the substrate.

The wire-suspended projection screen can further include a motor operably coupled to the roller assembly, the motor being selectively operable to rotate the roller assembly in each of a clockwise and a counter-clockwise direction.

A roller assembly for a wire-suspended projection screen can include a substantially cylindrical inner tube having a length dimension, a plurality of sleeves spaced-apart along the length dimension of the inner tube, thereby forming at least one gap between adjacent ones of the plurality of sleeves, and at least three wires, a first end of each of the at three wires operably coupled to the inner tube, one of the at least three wires extending outwardly from the inner tube through the at least one gap, a second end of each of the at least three wires adapted to attach to a projection screen. The roller assembly can further include a housing, the roller assembly being received in the housing. The housing can include a pair of spaced-apart roller hanger assemblies, the roller assembly being rotatably mounted between the roller hanger assemblies. A motor can be operably coupled to the roller assembly, the motor selectively operable to rotate the roller assembly in each of a clockwise and a counter-clockwise direction. The at least three wires can be equally spaced apart.

According to embodiments, the roller assembly can further include a screen assembly with a substrate having an upper edge, a projection surface affixed to the substrate, and a slat operably coupled with, and extending along, the upper edge of the substrate, a second end of each of the at least three wires operably coupled to the slat, wherein, as the roller assembly is rotated, each of the at least three wires winds around the inner tube. The slat can be received in a pocket defined by the substrate.

When the screen assembly is in a deployed position, the slat can be spaced-apart from the inner tube, and when the screen assembly is in a retracted position, the substrate and the projection surface of the screen assembly are wrapped around the plurality of sleeves. Each one of the plurality of sleeves of the roller assembly can define a recess, the recesses of adjacent ones of the sleeves being aligned along the length dimension of the inner tube to form a longitudinal recess, and the slat of the screen assembly can be received in the longitudinal recess when the screen assembly is in the retracted position.

In embodiments, when the screen assembly is in a deployed position, a deflection measured at a midpoint of the length dimension of the roller assembly can be five millimeters or less.

In embodiments, the roller assembly can further include a motor operably coupled to the roller assembly, the motor selectively operable to rotate the roller assembly in each of a clockwise and a counter-clockwise direction.

Advantages of embodiments of the invention are that roller deflection is minimized thereby reducing sagging at the center of the screen and avoiding wrinkles. Further, the sleeves and fitted upper slat present a smooth outer surface, thereby avoiding permanent wrinkles and lines in the screen in storage. The wire suspension of the screen avoids a large black area above the screen.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
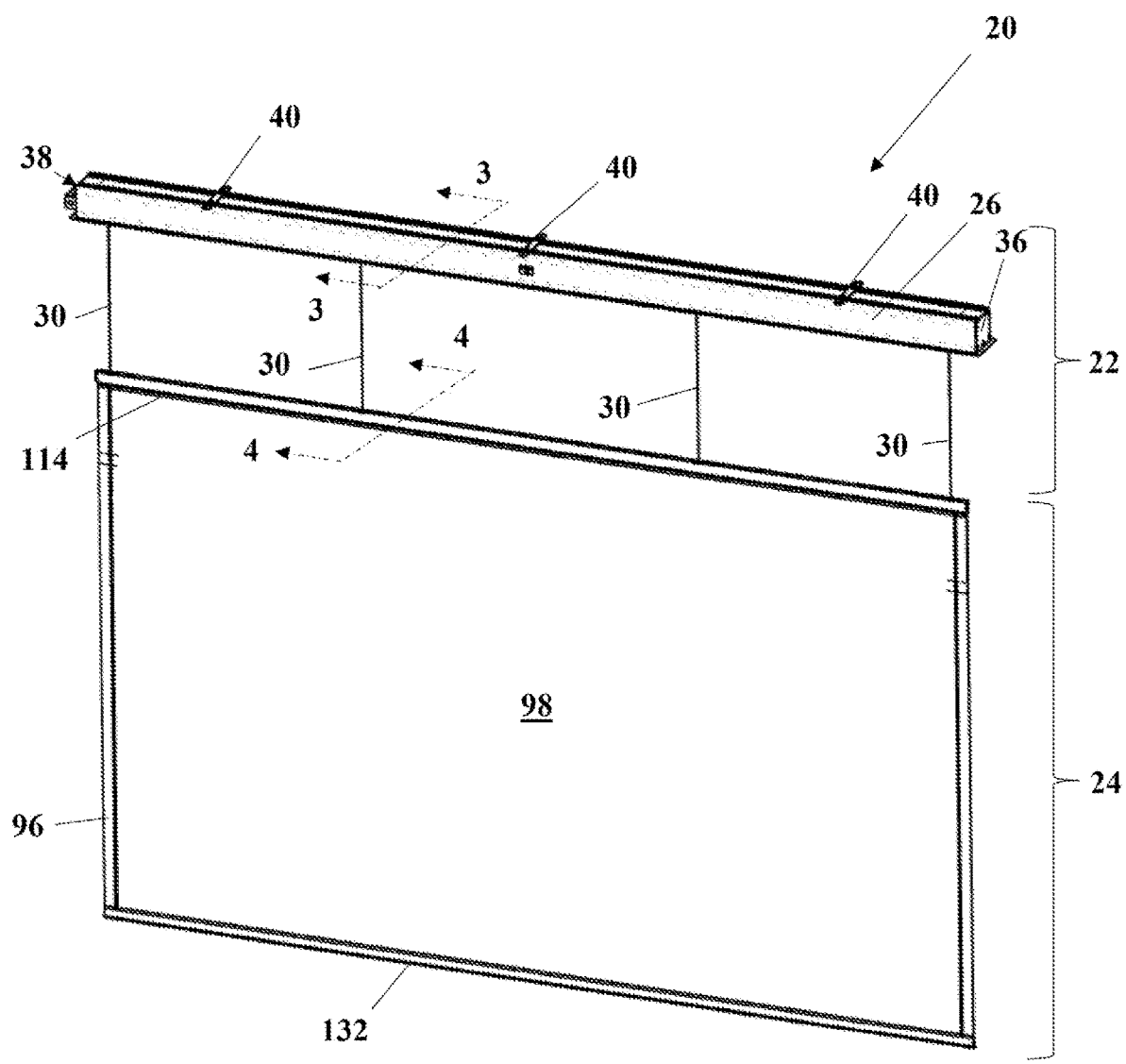
FIG. 1 is a front isometric view of a wire suspended projection screen according to an embodiment of the invention.
Figure 2:
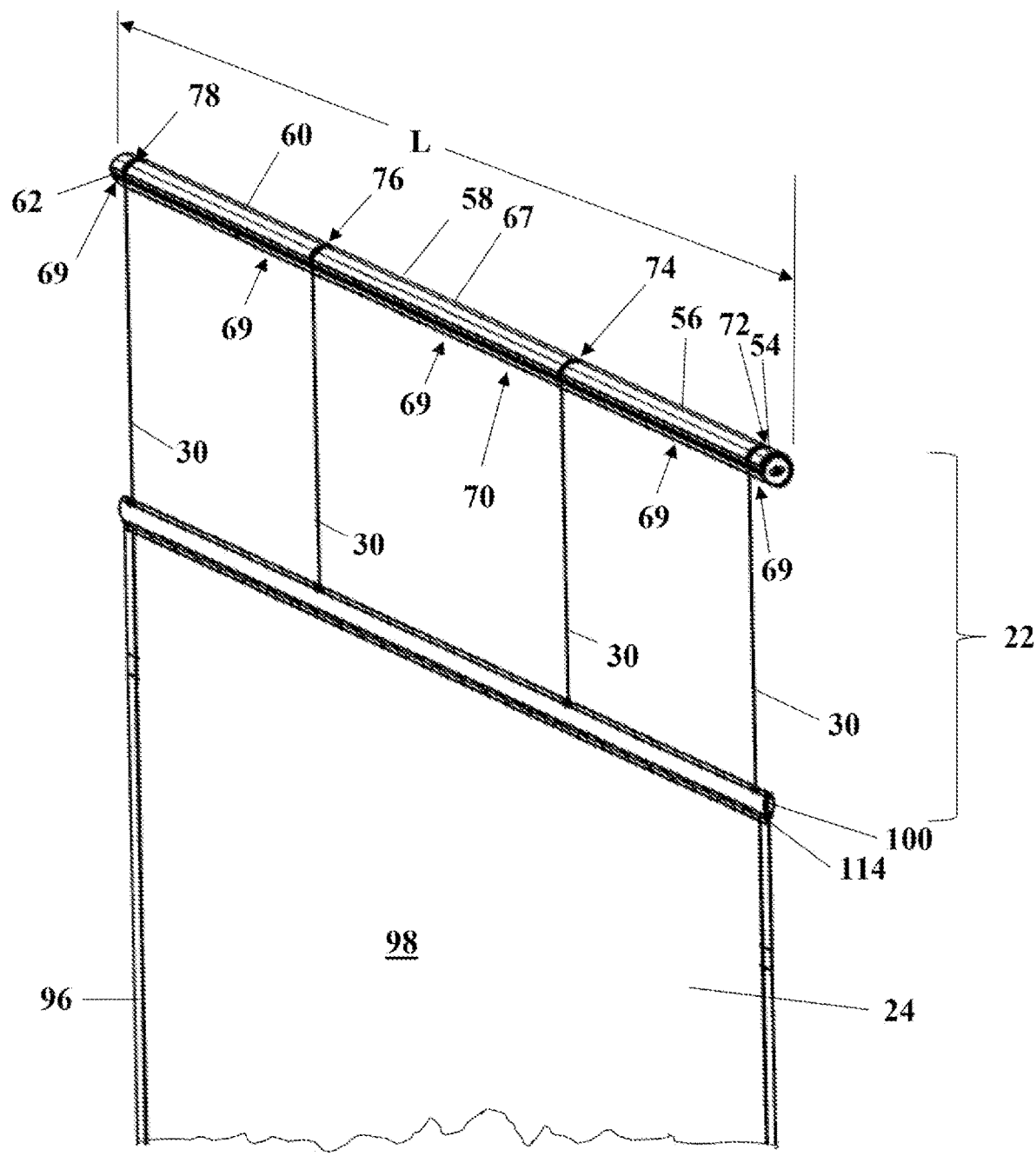
FIG. 2 is a partial front isometric view of the wire suspended projection screen of FIG. 1, with the housing omitted for clarity.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

There is depicted in FIGS. 1-10 wire suspended projection screen 20 according to embodiments of the invention. Wire suspended projection screen 20 generally includes roller assembly 22 and screen assembly 24.

Roller assembly 22 generally includes housing 26, roller 28, and wires 30. Housing 26 generally includes main body 32, bottom plate 34, end plates 36, 38, and hangers 40. Main body 32 generally includes front wall 42, top wall 44, rear wall 46, and open bottom 48. Bottom plate 34 extends part-way across open bottom 48 of main body 32, leaving opening 50.

Roller 28 generally includes hollow inner tube 52, sleeves 54, 56, 58, 60, 62, and roller hanger assemblies 64. Inner tube 52 has outer surface 53 and defines longitudinal recess 66. In a non-limiting example, inner tube 52 may be made from steel, but may also be made from any suitably rigid material. Desirably, inner tube 52 has sufficient stiffness so that overall deflection at center 67 does not exceed 5 mm when fully loaded with screen assembly 24.

Figure 3:
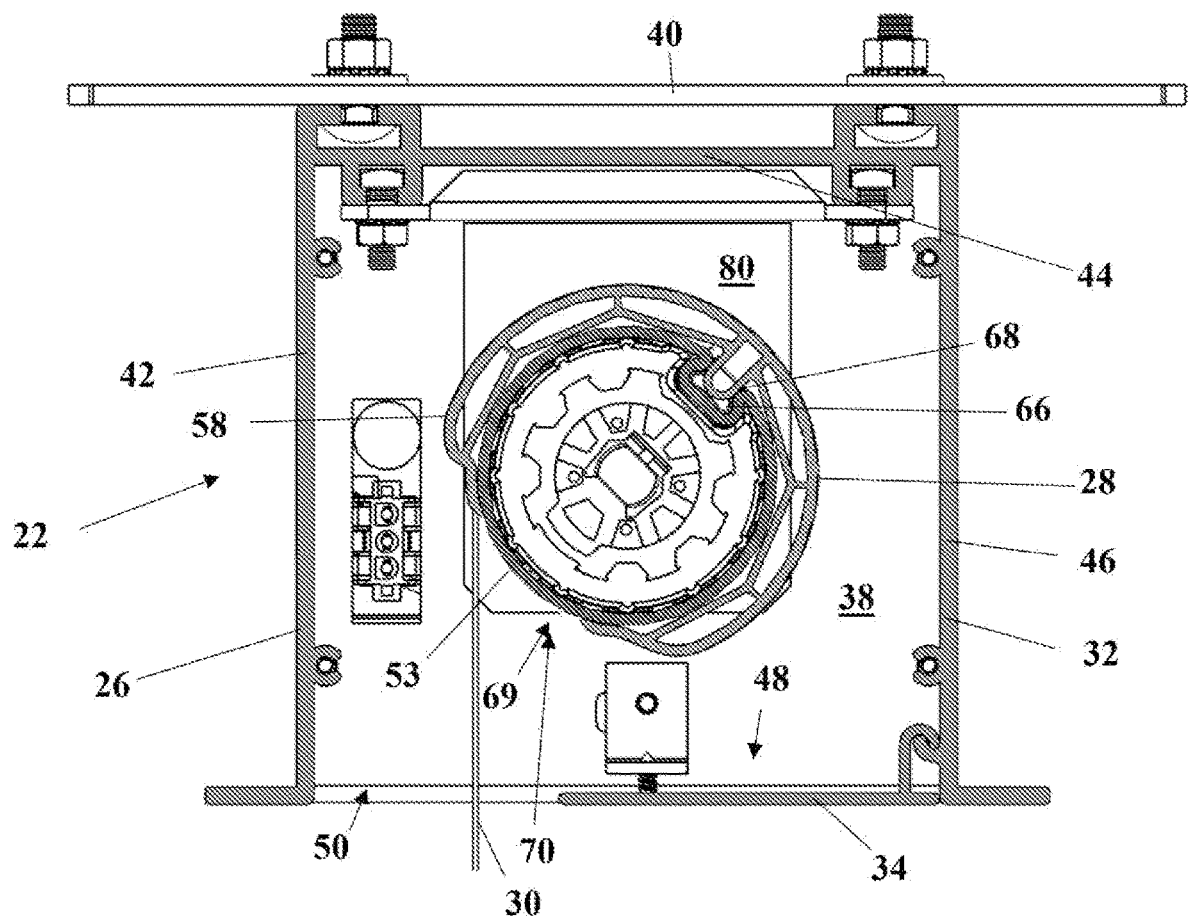
FIG. 3 is a cross-sectional view taken at section 3-3 of FIG. 1.
Figure 5:
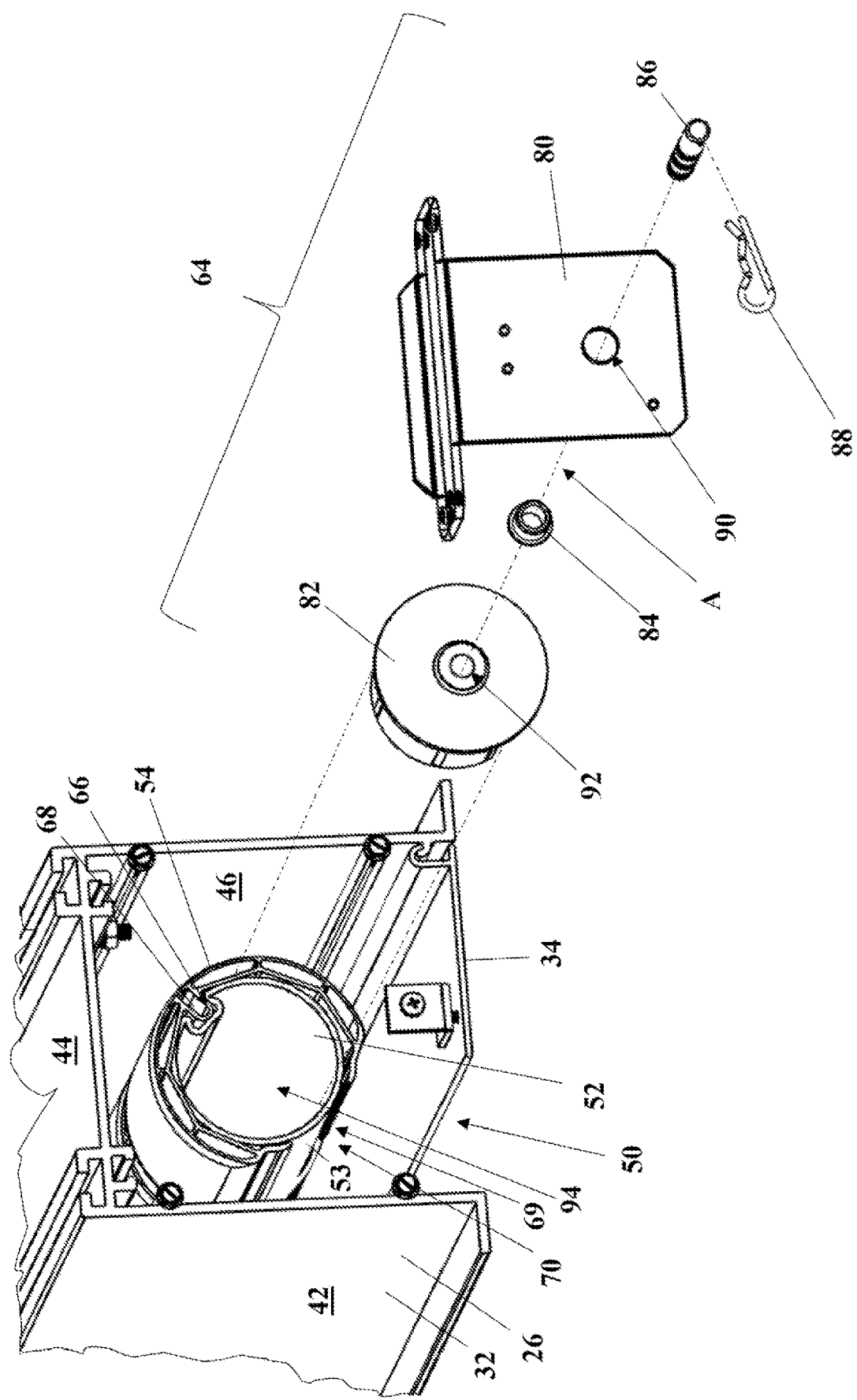
FIG. 5 is an exploded view of the roller end assembly of the wire suspended projection screen of FIG. 1.
Figure 8:
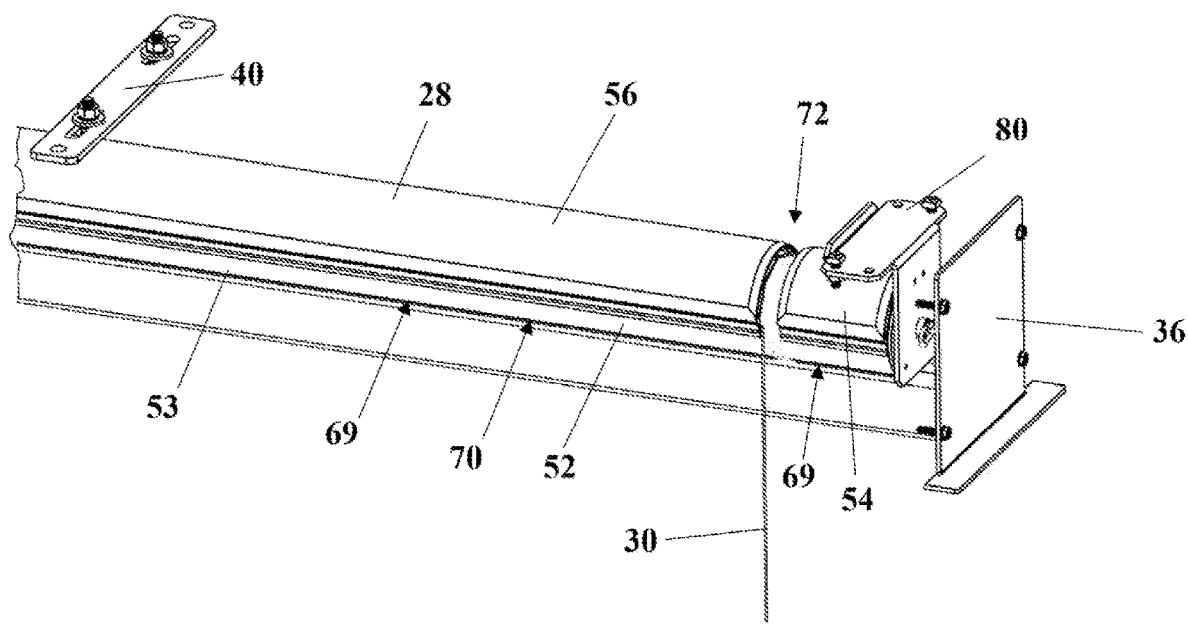
FIG. 8 is a partial front isometric view of the roller assembly of the wire suspended projection screen of FIG. 1.

Sleeves 54, 56, 58, 60, 62, define inwardly directed projections 68, which are received in longitudinal recess 66 to fix sleeves 54, 56, 58, 60, 62, to inner tube 52. In a non-limiting example, sleeves 54, 56, 58, 60, 62, may be extruded plastic or aluminum, but may also be made from any other suitable material. As depicted in FIGS. 3, 5, and 8, sleeves 54, 56, 58, 60, 62, extend part-way around inner tube 52. Each of sleeves 54, 56, 58, 60, 62, defines recess 69 in conjunction with outer surface 53 of inner tube 52. Recesses 69 are aligned so as to define recess 70 along the longitudinal length L of roller 28. Further, sleeves 54, 56, 58, 60, 62, are spaced apart along the length of inner tube 52, leaving gaps 72, 74, 76, 78.

Roller banger assemblies 64 are positioned at each end of roller 28. As depicted in FIG. 5, roller hanger assemblies 64 generally include bracket 80, roller end cap 82, bearing 84, pin 86, and cotter pin 88. Bearing 84 is received in aperture 90 defined in bracket 90. Pin 86 is received and fixed in aperture 92 defined in roller end cap 82. Bracket 80 is attached to the inner surface of top wall 44 of main body 32.

Pin 86 extends through and is rotatable in bearing 84. Roller 28 is laterally retained between brackets 80, with cotter pin 88 extending through pin 86. Roller end cap 82 is received in open end 94 of inner tube 52. Hence, roller 28 is suspended within housing 26 by brackets 80, and is rotatable about a longitudinal axis A defined by pins 86.

Figure 11:
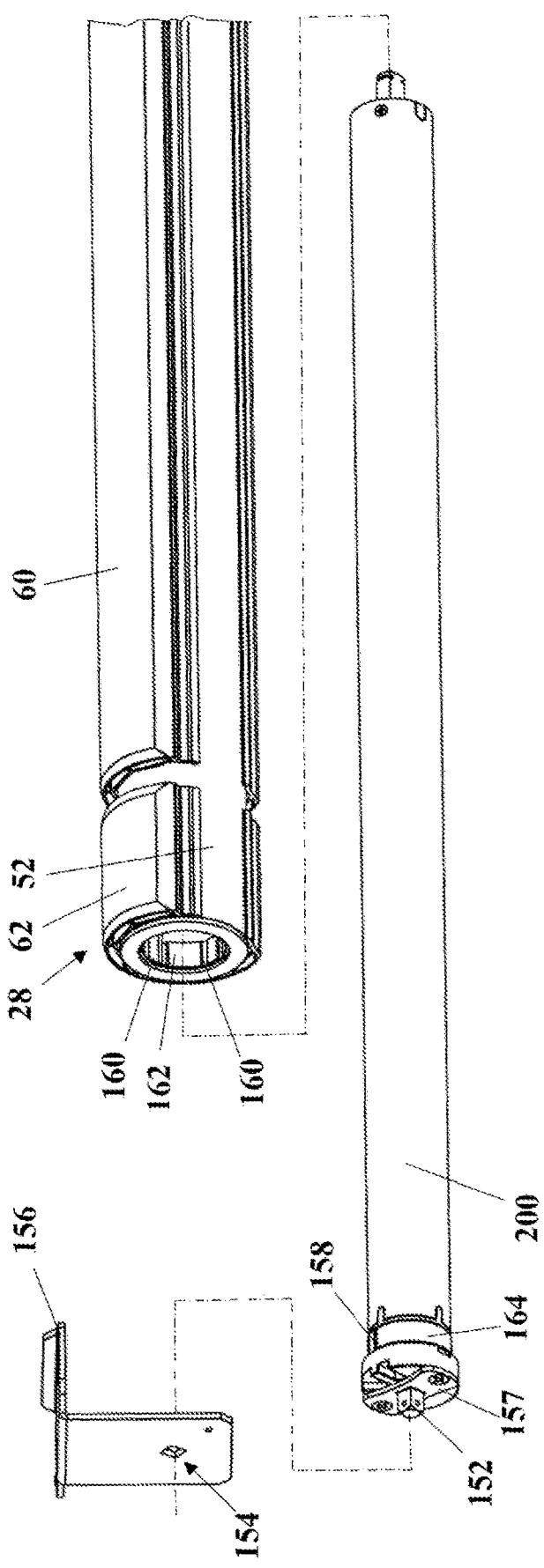
FIG. 11 is a partial exploded isometric view of a roller assembly of the wire suspended projection screen of FIG. 1, depicting a motor drive assembly for rotating the roller assembly.

In some embodiments, as depicted in FIG. 11, roller assembly 22 can include motor drive 150 for rotating roller 28. Motor drive 150 has square projection 152, which fits into square aperture 154 in bracket 156, which is positioned at an opposite end of roller 28 from a roller hanger assembly 64, to fix anchor portion 157 of motor drive 150 to bracket 156. Roller 28 is thus suspended and retained between bracket 156 and bracket 80 of the opposing roller hanger assembly 64. Motor drive 150 is received in hollow inner tube 52, and has splines 158 which engage with grooves 160 in an inner wall 162 of hollow inner tube 52 to fix drive portion 164 of motor drive 150 to roller 28. As will be appreciated by those of skill in the art, motor drive 150 can be connected with suitable source of electric power (not depicted) and selectively actuated with a switch (not depicted) to drive motor drive 150 and thereby rotate roller 28 in either a clockwise or counter-clockwise direction. Suitable limit switches (not depicted) can be provided to deactivate the motor at the limits of travel to prevent over-travel.

Figure 4:
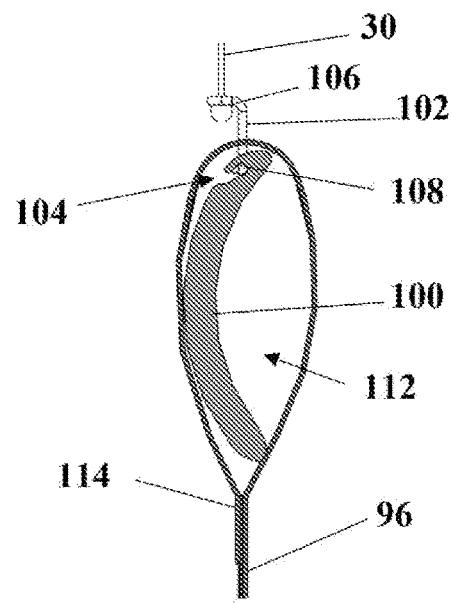
FIG. 4 is a cross-sectional view taken at section 4-4 of FIG. 1.
Figure 6:
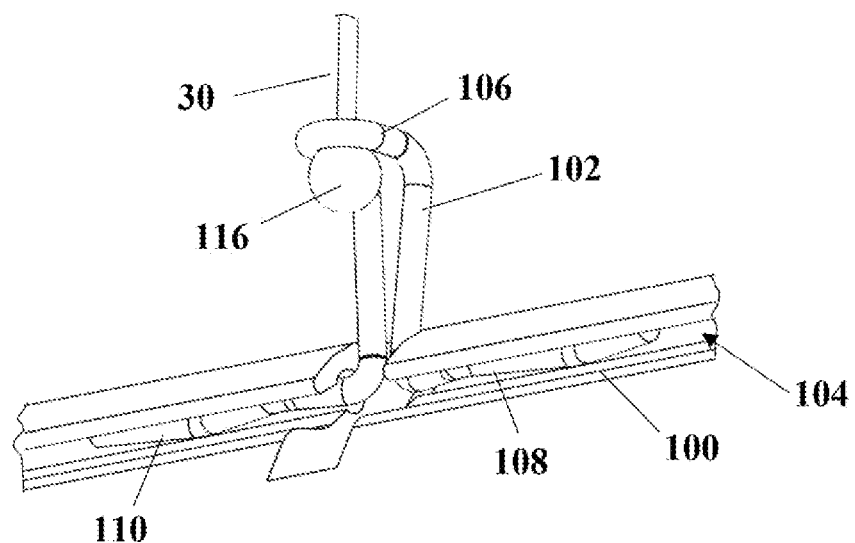
FIG. 6 is an isometric view of the screen attachment of the wire suspended projection screen of FIG. 1.
Figure 7:
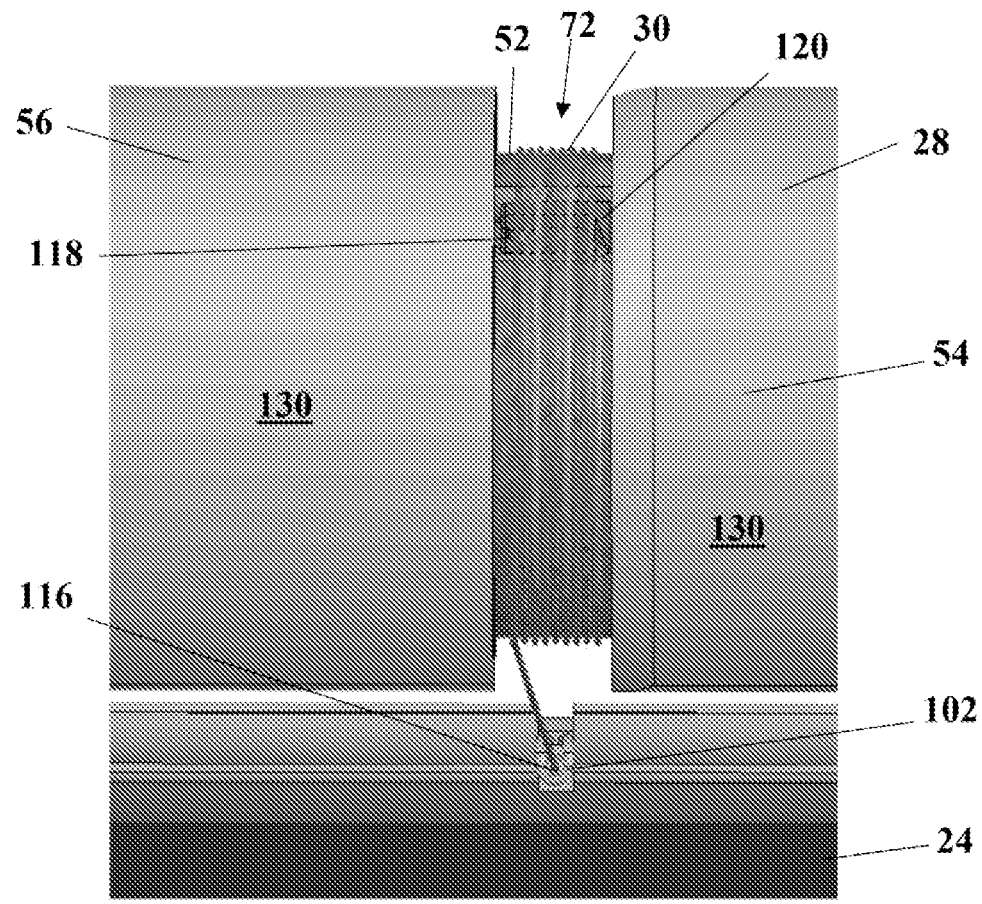
FIG. 7 is a top isometric view of one of the wire attachment points to the roller of the wire suspended projection screen of FIG. 1.

Screen assembly 24 generally includes projection surface 98, upper slat 100, and screen hangers 102. Upper slat 100 defines longitudinal recess 104, and is conformingly shaped so as to fit into recess 70 of roller 28. Screen hangers 102 have loop 106, and legs 108, 110. As depicted in FIG. 6, legs 108, 110, are received in longitudinal recess 104 to fix screen hangers 102 to upper slat 100. As depicted in FIG. 4, substrate 96 defines pocket 112 at upper margin 114, receiving upper slat 100 therein.

Figure 9:
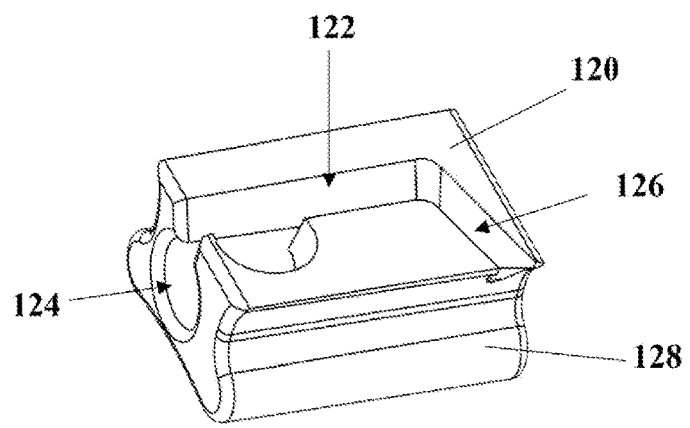
FIG. 9 is an isometric view of the wire anchor for the roller assembly of the wire suspended projection screen of FIG. 1.

Wires 30 have balls 116, 118, at each end. Lower ball 116 is received in loop 106 of screen hanger 102 to attach wire 30 to screen assembly 24. As depicted in FIG. 9, wire anchor 120 defines channel 122 with ball receiving portion 124 and wire receiving portion 126. Wire anchor 120 further defines attachment portion 128. Wire anchors 120 are positioned in gaps 72, 74, 76, 78, between sleeves 54, 56, 58, 60, 62, with attachment portions 128 received in longitudinal recess 66. Upper ball 118 is received in ball receiving portion 124 with wire 30 extending through wire receiving portion 126 to attach wire 30 to roller 28.

Figure 10:
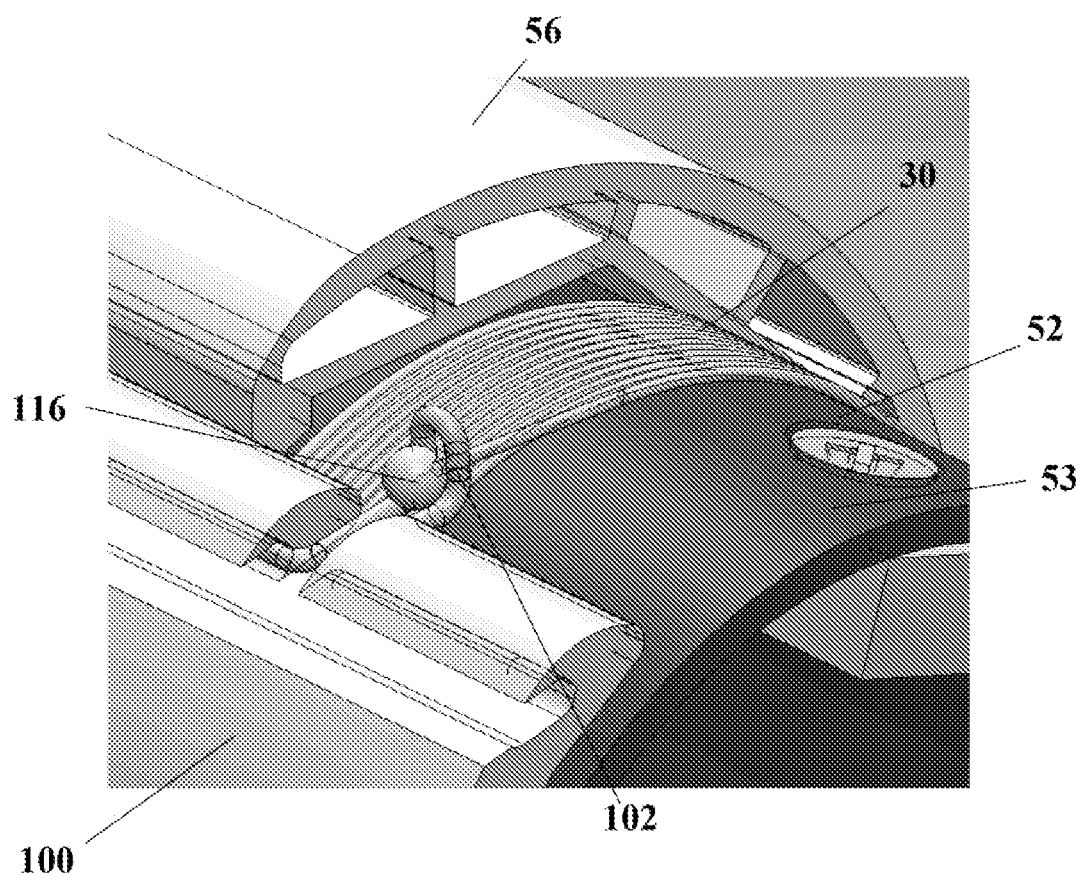
FIG. 10 is an isometric view of one of the wire attachment points to the roller of the wire suspended projection screen of FIG. 1, depicting the screen slat bar in engagement with the roller.

In use, roller assembly 22 can be attached to the ceiling (not depicted) of a space using hangers 40. As roller 28 is rotated, wires 30 wind and unwind on inner tube 52 to raise and lower projection surface assembly 24, depending on the direction of rotation of roller 28. When screen assembly is raised from the deployed position depicted in FIGS. 1 and 2, upper slat 100 will eventually reach roller 28 as depicted in FIG. 10, and fits into recess 70. As roller 28 is rotated further, substrate 96 and projection surface 98 roll onto outer surface 130 of sleeves 54, 56, 58, 60, 62, and over upper slat 100 until bottom margin 132 is retracted into housing 26 and screen assembly is in the fully retracted position. Screen assembly 24 can be lowered by rotating roller 28 in the opposite direction.

It will be further appreciated that, although the depicted embodiment includes four wires, three wires or more than four wires could be provided depending on the width of screen assembly 24. Further, wires 30 can be selectively positioned to distribute loading on roller 28 and minimize deflection of roller 28.

Advantages of embodiments of the invention are that roller deflection is minimized thereby reducing sagging at the center of the screen and avoiding wrinkles. Further, the sleeves and fitted upper slat present a smooth outer surface, thereby avoiding permanent wrinkles and lines in the screen in storage. The wire suspension of the screen avoids a large blank area above the screen.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A wire-suspended projection screen, comprising:
    a selectively rotatable roller assembly including:
        a substantially cylindrical inner tube having a length dimension and presenting a pair of opposing ends;
        a plurality of sleeves spaced-apart along the length dimension of the inner tube, thereby forming at least one gap between adjacent ones of the plurality of sleeves;
        at least three spaced-apart wires, a first end of each of the at least three spaced-apart wires operably coupled to the inner tube, a first one of the at least three spaced-apart wires coupled proximate one of the pair of opposing ends of the inner tube, a second one of the at least three spaced-apart wires coupled proximate the other one of the pair of opposing ends of the inner tube, and a third one of the at least three spaced-apart wires coupled at a point intermediate the opposing ends of the inner tube and extending outwardly from the inner tube through the at least one gap; and a screen assembly including:
a substrate having an upper edge;
a projection surface affixed to the substrate; and
a slat operably coupled with, and extending along, the upper edge of the substrate, a second end of each of the at least three spaced-apart wires operably coupled to the slat;

wherein, as the roller assembly is rotated, each of the at least three spaced-apart wires winds around the inner tube.

2. The wire-suspended projection screen of claim 1, wherein when the screen assembly is in a deployed position, the slat is spaced-apart from the inner tube, and wherein when the screen assembly is in a retracted position, the substrate and the projection surface of the screen assembly are wrapped around the plurality of sleeves.

3. The wire-suspended projection screen of claim 2, wherein each one of the plurality of sleeves of the roller assembly defines a recess in conjunction with an outer surface of the inner tube, the recesses of adjacent ones of the sleeves being aligned along the length dimension of the inner tube to form a longitudinal recess, and wherein the slat of the screen assembly is received in the longitudinal recess when the screen assembly is in the retracted position.

4. The wire-suspended projection screen of claim 2, wherein when the screen assembly is in a deployed position, a deflection measured at a midpoint of the length dimension of the roller assembly is five millimeters or less.

5. The wire-suspended projection screen of claim 1, further comprising a housing, the roller assembly being received in the housing.

6. The wire-suspended projection screen of claim 5, wherein the housing includes a pair of spaced apart roller hanger assemblies, the roller assembly being rotatably mounted between the roller hanger assemblies.

7. The wire-suspended projection screen of claim 1, wherein the slat is received in a pocket defined by the substrate.

8. The wire-suspended projection screen of claim 1, further comprising a motor operably coupled to the roller assembly, the motor being selectively operable to rotate the roller assembly in each of a clockwise and a counter-clockwise direction.

9. The wire-suspended projection screen of claim 1, wherein the at least three wires are equally spaced apart.

10. A roller assembly for a wire-suspended projection screen, comprising:
a substantially cylindrical inner tube having a length dimension and presenting a pair of opposing ends;
a plurality of sleeves spaced-apart along the length dimension of the inner tube, thereby forming at least one gap between adjacent ones of the plurality of sleeves; and
at least three spaced-apart wires, a first end of each of the at three spaced-apart wires operably coupled to the inner tube, a first one of the at least three spaced-apart wires coupled proximate one of the pair of opposing ends of the inner tube, a second one of the at least three spaced-apart wires coupled proximate the other one of the pair of opposing ends of the inner tube, and a third one of the at least three spaced-apart wires coupled at a point intermediate the opposing ends of the inner tube and extending outwardly from the inner tube through the at least one gap, a second end of each of the at least three spaced-apart wires adapted to attach to a projection screen.

11. The roller assembly of claim 10, further comprising a housing, the roller assembly being received in the housing.

12. The roller assembly of claim 11, wherein the housing includes a pair of spaced-apart roller hanger assemblies, the roller assembly being rotatably mounted between the roller hanger assemblies.

13. The roller assembly of claim 10, further comprising a motor operably coupled to the roller assembly, the motor selectively operable to rotate the roller assembly in each of a clockwise and a counter-clockwise direction.

14. The roller assembly of claim 10, wherein the at least three wires are equally spaced apart.

15. The roller assembly of claim 10, further comprising a screen assembly including:
a substrate having an upper edge;
a projection surface affixed to the substrate; and
a slat operably coupled with, and extending along, the upper edge of the substrate,
a second
end of each of the at least three wires operably coupled to the slat;
wherein, as the roller assembly is rotated, each of the at least three wires winds around the inner tube.

16. The roller assembly of claim 15, wherein when the screen assembly is in a deployed position, the slat is spaced-apart from the inner tube, and wherein when the screen assembly is in a retracted position, the substrate and the projection surface of the screen assembly are wrapped around the plurality of sleeves.

17. The roller assembly of claim 16, wherein each one of the plurality of sleeves of the roller assembly defines a recess in conjunction with an outer surface of the inner tube, the recesses of adjacent ones of the sleeves being aligned along the length dimension of the inner tube to form a longitudinal recess, and wherein the slat of the screen assembly is received in the longitudinal recess when the screen assembly is in the retracted position.

18. The roller assembly of claim 15, wherein when the screen assembly is in a deployed position, a deflection measured at a midpoint of the length dimension of the roller assembly is five millimeters or less.

19. The roller assembly of claim 15, wherein the slat is received in a pocket defined by the substrate.

20. The roller assembly of claim 15, further comprising a motor operably coupled to the roller assembly, the motor selectively operable to rotate the roller assembly in each of a clockwise and a counter-clockwise direction.

* * * * *